(12) United States Patent
Ly-Gagnon et al.

(10) Patent No.: US 9,125,158 B2
(45) Date of Patent: Sep. 1, 2015

(54) WIDEBAND DETECTION OF NARROWBAND TRIGGER SIGNALS

(75) Inventors: Yann Ly-Gagnon, San Jose, CA (US); Paul J. Husted, San Jose, CA (US); Olaf J. Hirsch, Sunnyvale, CA (US)

(73) Assignee: QUALCOMM Incorporated, San Diego, CA (US)

(*) Notice: Subject to any disclaimer, the term of this patent is extended or adjusted under 35 U.S.C. 154(b) by 773 days.

(21) Appl. No.: 13/366,835

(22) Filed: Feb. 6, 2012

(65) Prior Publication Data
US 2013/0202068 A1    Aug. 8, 2013

(51) Int. Cl.
| | |
|---|---|
| H04B 7/02 | (2006.01) |
| H04L 27/06 | (2006.01) |
| H04B 7/00 | (2006.01) |
| H04W 52/02 | (2009.01) |
| H04B 7/08 | (2006.01) |
| H04B 1/403 | (2015.01) |

(52) U.S. Cl.
CPC ........... *H04W 52/0225* (2013.01); *H04B 1/406* (2013.01); *H04B 7/0817* (2013.01); *Y02B 60/50* (2013.01)

(58) Field of Classification Search
USPC ......... 370/252, 276–282, 295, 298, 300, 302, 370/304, 324, 334, 339, 350, 431, 433, 437, 370/458, 464–469, 474–475, 480–484, 370/496–497, 503, 901, 913; 455/450–452, 455/464, 448
See application file for complete search history.

(56) References Cited

U.S. PATENT DOCUMENTS

| | | | |
|---|---|---|---|
| 6,289,036 B1* | 9/2001 | Saito et al. | 375/130 |
| 6,404,825 B1* | 6/2002 | Efstathiou | 375/326 |
| 6,850,735 B2* | 2/2005 | Sugar et al. | 455/67.11 |
| 6,898,235 B1* | 5/2005 | Carlin et al. | 375/219 |
| 7,106,814 B2* | 9/2006 | Carsello | 375/343 |
| 7,269,151 B2* | 9/2007 | Diener et al. | 370/329 |
| 8,145,264 B1* | 3/2012 | Hirsch et al. | 455/553.1 |
| 8,229,037 B2* | 7/2012 | LeBlanc et al. | 375/340 |
| 2001/0010689 A1* | 8/2001 | Awater et al. | 370/344 |
| 2002/0168003 A1* | 11/2002 | Richards | 375/239 |
| 2003/0103589 A1* | 6/2003 | Nohara et al. | 375/350 |
| 2004/0218699 A1 | 11/2004 | Carsello | |
| 2005/0088980 A1* | 4/2005 | Olkkonen et al. | 370/255 |
| 2005/0207512 A1* | 9/2005 | Earls et al. | 375/316 |
| 2005/0272376 A1* | 12/2005 | Vartiainen | 455/67.11 |
| 2007/0147523 A1* | 6/2007 | Sakata et al. | 375/260 |
| 2007/0281617 A1* | 12/2007 | Meylan et al. | 455/41.2 |

(Continued)

OTHER PUBLICATIONS

International Search Report and Written Opinion—PCT/US2013/024989—ISA/EPO—May 8, 2013.

(Continued)

*Primary Examiner* — Jeffrey M Rutkowski
*Assistant Examiner* — Jonathan B Wood
(74) *Attorney, Agent, or Firm* — DeLizio Law, PLLC

(57) ABSTRACT

A mechanism can be implemented for reducing the power consumption of a wireless radio device in establishing a wireless connection by utilizing a wideband signal to detect a narrowband trigger signal at a potential narrowband trigger frequency. The wireless radio device may operate a wideband receiver to receive an RF signal. Being aware of the potential narrowband trigger frequencies, the wideband receiver may utilize the received RF signal to detect the presence of a narrowband trigger signal at one of the potential narrowband trigger frequencies.

21 Claims, 6 Drawing Sheets

(56) References Cited

U.S. PATENT DOCUMENTS

| | | | |
|---|---|---|---|
| 2008/0019464 A1* | 1/2008 | Kloper et al. | 375/340 |
| 2008/0181155 A1* | 7/2008 | Sherman et al. | 370/311 |
| 2008/0182518 A1* | 7/2008 | Lo | 455/41.3 |
| 2008/0304550 A1* | 12/2008 | Hulvey | 375/136 |
| 2008/0309535 A1* | 12/2008 | Le Guillou | 341/143 |
| 2009/0046625 A1* | 2/2009 | Diener et al. | 370/319 |
| 2009/0082017 A1* | 3/2009 | Chang et al. | 455/435.2 |
| 2009/0185641 A1* | 7/2009 | Birru | 375/340 |
| 2009/0232126 A1* | 9/2009 | Cordeiro et al. | 370/350 |
| 2010/0061432 A1* | 3/2010 | Ben-Hamo et al. | 375/222 |
| 2010/0093279 A1* | 4/2010 | Linsky et al. | 455/41.2 |
| 2010/0316099 A1* | 12/2010 | Sugita et al. | 375/219 |
| 2011/0130092 A1* | 6/2011 | Yun et al. | 455/39 |
| 2011/0185059 A1* | 7/2011 | Adnani et al. | 709/224 |
| 2011/0249571 A1* | 10/2011 | Das et al. | 370/252 |
| 2011/0274021 A1* | 11/2011 | He et al. | 370/311 |
| 2012/0008626 A1* | 1/2012 | Brederveld et al. | 370/392 |
| 2012/0171978 A1* | 7/2012 | Sharma et al. | 455/230 |
| 2015/0092649 A1* | 4/2015 | Wu et al. | 370/311 |

OTHER PUBLICATIONS

Hulvey, Robert, "The Bluetooth core specification Version for Low Latency Reconnections", CSWG F2F, Nov. 2010, Brussels. Robert Hulvey, Broadcom. Nov. 2010, 21 pages.

* cited by examiner

WIDEBAND DETECTION OF NARROWBAND TRIGGER SIGNALS

TECHNICAL FIELD

The present application relates to wireless radio systems, and more particularly to a wideband detection mechanism of a narrowband trigger signal.

BACKGROUND

A Bluetooth® wireless radio protocol is used by Bluetooth-enabled wireless devices to establish a Bluetooth communication link using a short-range wireless connection. To establish a Bluetooth communication link, a first Bluetooth-enabled device attempting to establish a connection with a second Bluetooth-enabled device in the network, repeatedly broadcasts trigger signals which may include the unique device access code (DAC) of the second Bluetooth-enabled device. To establish a connection with requesting Bluetooth-enabled devices, the second Bluetooth-enabled device can periodically scan predefined radio frequencies within the 2.4 GHz (2.402 GHz and 2.480 GHz) industrial, scientific, and medical (ISM) radio band to listen for any trigger signals for the duration of a scanning time interval.

In a specific Bluetooth specification, the trigger signal may be transmitted at one of four possible trigger frequencies, 2402 MHz, 2425 MHz, 2450 MHz and 2480 MHz. If the second Bluetooth enabled device receives a trigger signal during a duration of the scanning time interval, the second Bluetooth enabled device can correlate the device access code included in the trigger signal against the unique access code of the second Bluetooth enabled device to determine if there is a positive correlation between the device access code received and the unique device access code of the second Bluetooth enabled device. If a positive correlation exists, a connection can be established between the first Bluetooth enabled device and the second Bluetooth enabled device.

Low power operation of a wireless radio device can be desirable in order to prolong the battery life of the device. In order to establish connections among Bluetooth enabled devices, one of the devices may periodically operate its radio receiver to open a scanning window to receive trigger signals which may or may not include its unique device access code. Operating the radio receiver to open the scanning window in order to establish a wireless connection may represent a significant portion of the power consumed by a Bluetooth enabled device.

In addition to Bluetooth devices, Wi-Fi or wireless local area networks (WLANs), operating under the IEEE 802.11 standard, also utilize the ISM radio frequency band for reception and transmission. As such, a Bluetooth device located in close proximity to a WLAN device can operate within the same radio frequency range while maximizing throughput and performance for both standards. Adaptive frequency hopping (AFH) is typically employed in the Bluetooth standard to mitigate radio interference in this common frequency band, thereby minimizing the possibility of performance degradation and improving the coexistence of the two standards. Bluetooth AFH uses a 1 MHz wide channel and a hop rate of 1600 hops/sec between the 2.4 to 2.4835 GHz, resulting in 79 different channels. Alternatively, WLAN IEEE 802.11 technology may use any of 11, 22 MHz-wide, subchannels allocated across 83.5 MHz of the 2.4 GHz frequency band.

Additionally, modern wireless devices may comprise both Bluetooth and WLAN functionality. Incorporation of a Bluetooth radio and a WLAN radio in a single device is commonly referred to as collocation. For example, Bluetooth and WLAN radios may be collocated devices such as mobile phones, laptops, personal digital assistants (PDAs), etc. In these devices, the Bluetooth radio and the WLAN radio may need to receive or transmit simultaneously. Collocation of the Bluetooth radio and the WLAN radio in a single device further increases the possibility of interference within the channel. It is desirable to minimize such interference resulting from the collocation of the two technologies on the same wireless device, thereby improving the coexistence of the two technology standards.

SUMMARY

Various embodiments for a wideband detection mechanism of a narrowband trigger signal are disclosed. In one embodiment, a radio frequency (RF) signal is received at a wideband receiver of a wireless network device. The wireless network device comprises at least one wideband receiver and at least one narrowband receiver. One or more potential trigger frequencies are identified for a narrowband trigger signal transmission. The one or more potential trigger frequencies are positioned within a bandwidth of the received RF signal. The received RF signal is sampled to identify a plurality of signal samples representative of the received RF signal. For each of the one or more potential trigger frequencies, it is determined whether the plurality of signal samples centered at the potential trigger frequency comprise the narrowband trigger signal. A notification indicating the presence of the narrowband trigger signal is provided to the narrowband receiver, in response to determining that the plurality of signal samples centered at a first of the one or more potential trigger frequencies comprise the narrowband trigger signal.

DESCRIPTION OF EMBODIMENT(S)

Figure 1:
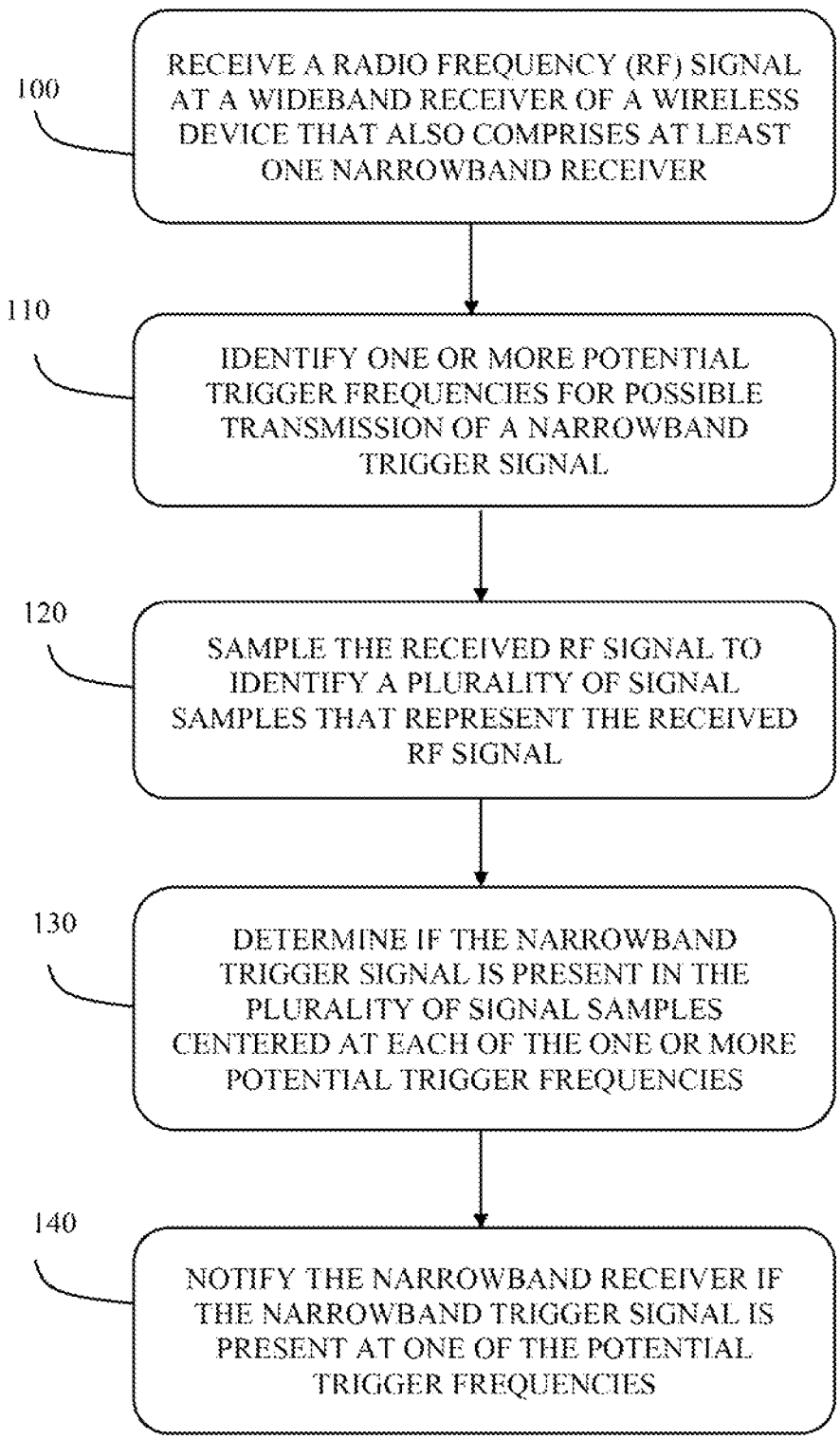
FIG. 1 is a flow diagram illustrating example operations of a wideband receiver for detecting a narrowband trigger signal within a received signal.

Those of ordinary skill in the art will realize that the following detailed description of embodiments in this specification is illustrative only, and is not intended to be in any way limiting. Other embodiments will readily suggest themselves to such skilled persons having the benefit of this disclosure. It will be apparent to one skilled in the art that these specific details may not be required to practice the embodiments. For instance, although examples refer to identifying a Bluetooth trigger signal within a received WLAN signal, embodiments are not so limited. In other embodiments, operations for wideband detection of narrowband trigger signals as described herein can be implemented by other communication standards and devices. In other instances, well-known devices are shown in block diagram form to avoid obscuring the present application. In the following description of the embodiments, substantially the same parts are denoted by the same reference numerals.

A Bluetooth-enabled device ("requesting Bluetooth device") requesting a reconnection with another Bluetooth-enabled device ("connectable Bluetooth device") typically transmits a trigger signal at one of multiple potential trigger frequencies (e.g., four potential trigger frequencies). The four potential trigger frequencies may be evenly distributed across the ISM band and may additionally be positioned to avoid the WLAN transmission channels. Each of the four potential trigger frequencies may represent a 1 MHz narrowband channel centered at each of the four potential trigger frequencies. In accordance with a specific 2.4 GHz implementation of the Bluetooth communication protocol, the narrowband channels representing the four potential trigger frequencies may be centered at 2402 MHz, 2425 MHz, 2450 MHz, and 2480 MHz. However, other potential trigger frequencies are within the scope of the embodiments presented herein and fewer or more than four frequencies may be available as potential trigger frequencies. In addition, the four potential trigger frequencies may be positioned outside of non-overlapping WLAN channels 1, 6 and 11, where channel 1 is a 22 MHz wideband channel centered at 2412 MHz, channel 6 is a 22 MHz wideband channel centered at 2437 MHz and channel 11 is a 22 MHz wideband channel centered at 2462 MHz.

Traditionally, to establish a reconnection between the requesting Bluetooth device and the connectable Bluetooth device, the requesting Bluetooth device may transmit a trigger signal at any one of the four potential trigger frequencies and the connectable Bluetooth device may scan all four possible trigger frequencies to determine whether the requesting Bluetooth device is transmitting a trigger signal to request a reconnection to the connectable Bluetooth device. The trigger signal transmitted by the requesting Bluetooth device may include an access code, unique to the connectable Bluetooth device. The requesting Bluetooth device may repeatedly transmit the trigger signal for a specified duration of time. For example, the trigger signal may include a 32-bit access code and the trigger signal may be repeated for a duration of 22 ms. In this example, on receiving the 32-bit access code the connectable Bluetooth device may respond within 7.5 ms by transmitting a beacon signal, prior to the requesting Bluetooth device achieving synchronization with the connectable Bluetooth device. The connectable Bluetooth device may also scan the potential trigger frequencies for a trigger signal from the requesting Bluetooth device approximately every 30 ms.

The requesting Bluetooth device typically determines which of the potential trigger frequencies should be employed to transmit the trigger signal prior to actually transmitting the trigger signal. However, the connectable Bluetooth device is typically unaware of the potential trigger frequency that was selected by the requesting Bluetooth device. Therefore, in accordance with existing reconnection procedures, the connectable Bluetooth device may consecutively scan each of the potential trigger frequencies in an attempt to locate the trigger frequency on which the trigger signal was transmitted by the requesting Bluetooth device. To scan the potential trigger frequencies, the connectable Bluetooth device can power-up its radio frequency receiver, tune the receiver to one of the potential trigger frequencies and listen for the trigger signal. Because the connectable Bluetooth device is unaware of the trigger frequency that was employed to transmit the trigger signal, the connectable Bluetooth device may tune to (and listen on) each of the potential trigger frequencies. In one example, for a 32-bit access code, the receiver can scan each of four potential trigger frequencies for approximately 70 μs to receive and to correlate the access code with an expected access code associated with the connectable Bluetooth device. In this example, tuning the receiver to one of the four potential trigger frequencies may typically require 150 μs. As such, operating the receiver to scan the four potential trigger frequencies to locate the trigger signal and the associated access code may require that the receiver be operating for 880 μs (4*70 μs+4*150 μs). Thus, operating the receiver to scan the four potential trigger frequencies to locate the trigger signal can consume a large amount of time and can also represent a significant portion of the power consumed by a Bluetooth-enabled device It may be desirable to reduce the amount of time that the radio of the Bluetooth-enabled device is powered-on to receive trigger signals and to establish a connection with another Bluetooth-enabled device. It may also be desirable to reduce the time required to locate the trigger signal, thereby reducing the operating time of the receiver and the associated power consumption.

Additionally, when a Bluetooth device is collocated with a WLAN device on a communication device, the WLAN receiver may need to be disabled to allow the Bluetooth device to scan for a possible Bluetooth trigger signal from another Bluetooth device requesting a reconnection with the wireless device. In the existing reconnection procedures, the WLAN device is powered-down and the Bluetooth device is powered-up every predetermined time interval (e.g., every 30 ms) to scan the potential trigger frequencies for the trigger signal. Repeatedly powering-down the WLAN device and powering-up the Bluetooth device can increase the power consumption of the communication device. It is desirable to minimize the time spent and power consumed in powering-down and powering-up the Bluetooth device and the WLAN device to reduce the power consumption of the communication device. In addition, coexistence between the collocated Bluetooth and WLAN devices can be improved if the time required to scan for the Bluetooth trigger signals can be reduced and the interruptions to the operation of the WLAN device (e.g., by the Bluetooth device scanning the potential trigger frequencies) can be decreased.

A wireless wideband receiver can implement functionality to reduce power consumption and improve the coexistence of a communication device that comprises Bluetooth device and a collocated WLAN device. In some embodiments, after a requesting Bluetooth device has been disconnected from a connectable Bluetooth device, scanning of a WLAN wideband channel can be initiated during an inactive period of the WLAN wideband channel. The WLAN wideband channel can be scanned to identify a narrowband Bluetooth trigger signal within a radio frequency (RF) signal (e.g., a wideband signal or a another suitable signal) received at the wireless wideband receiver. In some embodiments, if the wideband WLAN channel experiences periods of inactivity on a regular basis, the wireless wideband receiver (e.g., a WLAN receiver of the WLAN device) can be used to detect the narrowband Bluetooth trigger signal without requiring the WLAN device to be powered-down and the Bluetooth device to be subsequently powered-up. This can reduce the power consumption of the communication device and can improve the coexistence of the collocated Bluetooth device and WLAN device.

FIG. 1 is a flow diagram illustrating example operations of a wideband receiver for detecting a narrowband trigger signal within a received signal. The flow begins at block 100.

At block 100, a radio frequency (RF) signal is received at a wideband receiver of a wireless device that comprises at least one wideband receiver and at least one narrowband receiver. In one example, the wireless device can comprise a WLAN device and a collocated Bluetooth device. The wideband receiver can be a WLAN receiver associated with the WLAN device and the narrowband receiver can be a Bluetooth receiver associated with the Bluetooth device. The flow continues at block 110.

At block 110, one or more potential trigger frequencies are identified for the possible transmission of a narrowband trigger signal. The wideband receiver (e.g., the WLAN receiver) can identify the potential trigger frequencies that are positioned within the bandwidth of the RF signal received at block 100. As described above, the potential trigger frequencies are known by the requesting device (e.g., a requesting Bluetooth device) that is transmitting the narrowband trigger signal. In some implementations, an indication of the potential trigger frequencies may be communicated to the WLAN receiver. In some embodiments, four potential Bluetooth trigger frequencies can be selected (e.g., by the transmitting Bluetooth device) for the transmission of a Bluetooth trigger signal and the four potential Bluetooth trigger frequencies can be communicated to the WLAN receiver. In one example, the four Bluetooth trigger frequencies may be located at 2402 MHz, 2425 MHz, 2450 MHz and 2480 MHz. In another implementation, the potential trigger frequencies may be hardcoded (or pre-programmed) into the requesting Bluetooth device and the receiving wireless device. In some implementations, a firmware or software solution can be employed to dynamically (or statically) adjust the potential trigger frequencies. The flow continues at block 120.

At block 120, the received RF signal is sampled to identify one or more signal samples that are representative of the received RF signal. In one implementation, after the WLAN signal is received at the WLAN receiver, the WLAN signal can be sampled in the frequency domain to identify one or more signal samples that are representative of the wideband signal in the time domain. For example, after the receipt of a WLAN signal at a WLAN receiver, the WLAN signal can be sampled in the frequency domain to identify a plurality of signal samples that are representative of the WLAN signal in the time domain. The analog received WLAN signal can be converted to a corresponding digital representation (e.g., a plurality of digital signal samples) using suitable analog to digital conversion techniques. The flow continues at block 130.

At block 130, it is determined if the narrowband trigger signal is present in the plurality of signal samples centered at each of the potential trigger frequencies. With reference to the above example, where there are four potential Bluetooth trigger frequencies, it can be determined if the Bluetooth trigger signal is present in the plurality of signal samples centered at each of the four potential Bluetooth trigger frequencies. Determining the presence of the narrowband Bluetooth trigger signal may require the WLAN receiver to correlate an access code within the plurality of signal samples with an expected access code associated with the wireless device, as will be further described with reference to FIGS. 2-5. The flow continues at block 140.

At block 140, the narrowband receiver of the wireless device is notified if the narrowband trigger signal is present at one of the potential trigger frequencies. For example, if the Bluetooth trigger signal is present in the plurality of signal samples at one of the four potential Bluetooth trigger frequencies, the Bluetooth receiver is notified of the presence of a Bluetooth trigger signal. In some embodiments, in response to the notification that a narrowband Bluetooth trigger signal was detected at one of the potential Bluetooth trigger frequencies, the wideband WLAN receiver may be powered-down and the narrowband Bluetooth receiver may be powered-up. In another embodiment, the wideband WLAN receiver may not be powered-down. Instead, in response to the notification that a narrowband Bluetooth trigger signal was detected at one of the Bluetooth trigger frequencies, the Bluetooth receiver may be powered-up without powering-down the WLAN receiver. The Bluetooth receiver can then facilitate communication of narrowband signal packets (e.g., Bluetooth packets) between the requesting Bluetooth device that transmitted the Bluetooth trigger signal and the connectable Bluetooth device (e.g., the connectable Bluetooth device of the wireless device). From block 140, the flow ends.

As described above with reference to FIG. 1, a WLAN signal received at the WLAN receiver of the wireless device can be used to detect if a Bluetooth trigger signal is present in the WLAN signal and to prompt the Bluetooth receiver to initiate a reconnection with another Bluetooth transmitter at the identified Bluetooth trigger frequency. Because the WLAN signal may be used to detect the presence of a Bluetooth trigger signal, the Bluetooth receiver may operate for only one receive time interval (e.g., a 70 μs time interval) and one radio tuning time interval (e.g., a 150 μs time interval) to correlate the expected access code with the detected Bluetooth trigger signal. Utilizing the WLAN signal to detect the Bluetooth trigger signal may eliminate/minimize the need for the Bluetooth receiver (of the connectable Bluetooth device) to periodically scan all the potential trigger frequencies. The connectable Bluetooth device may utilize the Bluetooth trigger frequency detected by the WLAN receiver to establish a reconnection with the requesting Bluetooth device, thereby reducing the time consumed for establishing a reconnection between the requesting Bluetooth device and the connectable Bluetooth device. As described above, this can reduce the power consumption of the wireless device (that comprises the collocated WLAN and Bluetooth devices) and improve the coexistence of the collocated WLAN receiver and Bluetooth receiver.

It should be noted that in some embodiments, the RF signal received at block 100 may be a WLAN signal comprising WLAN packets and the narrowband trigger signal may be a Bluetooth trigger signal comprising Bluetooth packets. In some implementations, the wireless device comprises a Bluetooth device and a collocated WLAN device. In this implementation, the wireless device may comprise a Bluetooth receiver and a WLAN receiver. The Bluetooth receiver and the WLAN receiver may share one or more logic circuits, one or more analog processing units (e.g., a low noise amplifier (LNA), a power amplifier (PA), etc.), one or more digital processing units, antennas, etc. In one implementation, the Bluetooth receiver and the WLAN receiver can be embodied on distinct integrated circuits on a common circuit board. In another implementation, the Bluetooth receiver and the WLAN receiver can be embodied on a single integrated circuit.

In accordance with a Bluetooth specification, a connectable Bluetooth device may scan all the potential Bluetooth trigger frequencies at regularly scheduled intervals to look for a trigger signal from a requesting Bluetooth device. In one embodiment, the connectable Bluetooth device may scan the potential Bluetooth trigger frequencies at least every 30 ms. In other embodiments, the connectable Bluetooth device may scan the potential Bluetooth trigger frequencies every predetermined scan time interval. If the WLAN receiver is inactive and is not receiving or transmitting WLAN packets, the WLAN receiver may be used to scan the potential trigger frequencies for the Bluetooth trigger signal during the periods of WLAN inactivity. In some embodiments when the WLAN device is operating in an environment where the WLAN traffic is relatively light (e.g., if the WLAN receiver is transmitting/receiving less than a normal or average amount of traffic), the WLAN device may experience adequate periods of inactivity to accommodate the predetermined scan time interval. With reference to the above example where the predetermined scan time interval is 30 ms, the WLAN receiver may be programmed to wake up autonomously every 30 ms and scan for Bluetooth trigger signals during relatively light WLAN traffic. By configuring the WLAN receiver to periodically scan for Bluetooth trigger signals, the Bluetooth receiver may scan less often while still meeting the specification requirement. Configuring the WLAN receiver to scan for the Bluetooth trigger signals can improve the coexistence of the collocated Bluetooth receiver and WLAN receiver.

However, if the WLAN device is operating in relatively heavy WLAN traffic (e.g., if the WLAN receiver is transmitting/receiving more than a normal or average amount of traffic), the periods of inactivity experienced by the WLAN device may not be adequate to accommodate the predetermined scan time interval. In accordance with a WLAN communication protocol (e.g., IEEE 802.11 communication protocol), when WLAN devices are contending for access to the wireless communication channel, the WLAN devices may utilize a back-off algorithm that randomizes the access of the WLAN devices to the communication channel. In other words, the WLAN devices typically sense the communication channel and back-off for a randomly selected time interval ("random back-off period") before transmitting the WLAN packets. The random back-off period can represent a number of "slots," or periods of time for which a particular WLAN device is idle prior to transmitting WLAN packets via the communication channel. The random back-off period for each WLAN device contending for the communication channel can be selected randomly to reduce collisions encountered on the communication channel. In typical operation, during the random back-off period, the WLAN receiver may be disabled (e.g., switched off, configured in an inactive operating mode, etc.) until the random back-off period expires. After the random back-off period expires, the WLAN receiver can be enabled (e.g., switched on, configured in an active operating mode, etc.) and may then access the communication channel. However, in some embodiments, during heavy WLAN traffic, the WLAN receiver can use the random back-off period to scan for the Bluetooth trigger signals. Thus, during the random back-off period, the WLAN receiver may not be disabled and may instead be configured to scan the WLAN channel for the Bluetooth trigger signal during the random back-off period. In this embodiment, the WLAN receiver may be configured to scan the WLAN channel for the presence of a Bluetooth trigger signal at the beginning of the random back-off period, so that the WLAN receiver remains in an ON (or active) state after the random back-off period starts. In another embodiment, the WLAN receiver may be configured to perform the scanning before the random back-off period elapses. In this embodiment, the WLAN receiver can be disabled when the random back-off period begins and can be enabled before the random back-off period elapses, so that the WLAN receiver can scan the WLAN channel for the Bluetooth trigger signal before the random back-off period expires. Thus, the WLAN receiver may not operate during the entire random back-off period and may utilize only a portion of the entire random back-off period to scan for the Bluetooth trigger signal.

Figure 2:
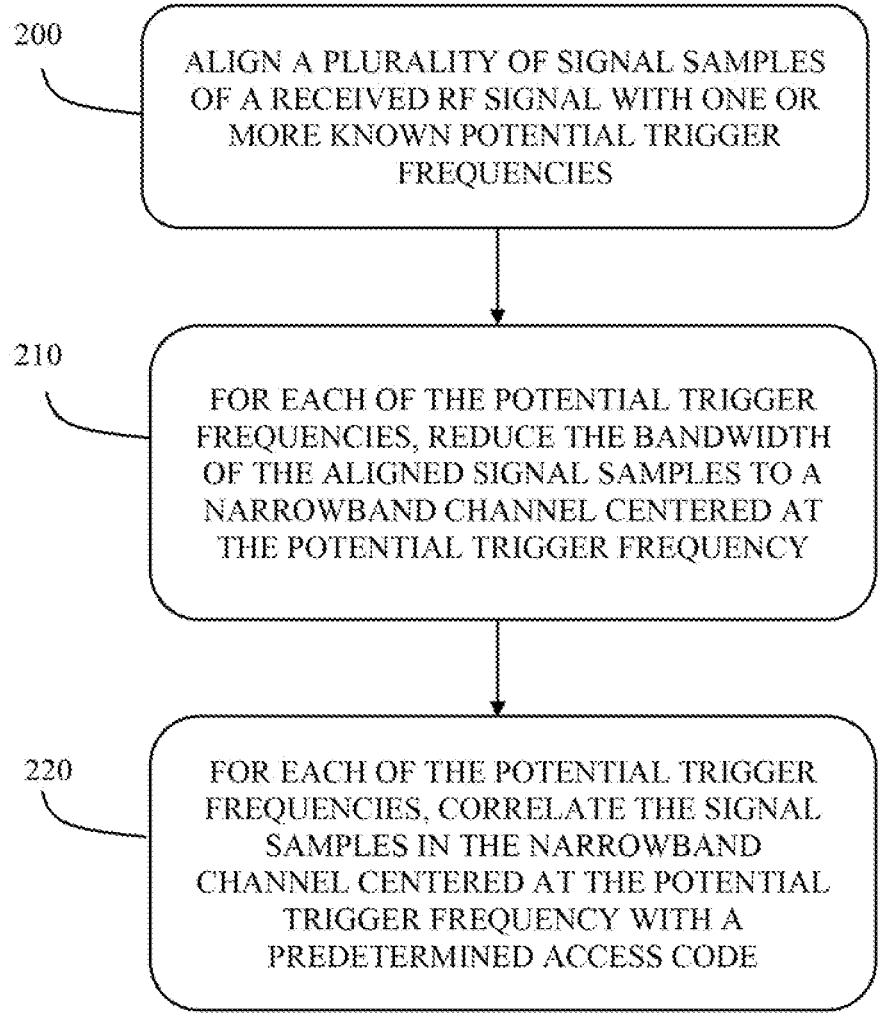
FIG. 2 is a flow diagram illustrating example operations of a wideband receiver for determining if a narrowband trigger signal is present in a plurality of signal samples at a potential trigger frequency utilizing parallel receive chains.

Various methods may be used to determine if the plurality of signal samples of the received RF signal (e.g., the WLAN signal received by the wideband WLAN receiver) comprises the narrowband trigger signal centered at one of the potential trigger frequencies (described above at block 130 of FIG. 1). One example method is illustrated in the flow diagram of FIG. 2. FIG. 2 depicts example operations of a wideband receiver for determining if a narrowband trigger signal is present in a plurality of signal samples at a potential trigger frequency utilizing parallel receive chains. The flow diagram of FIG. 2 begins at block 200.

At block 200, a plurality of signal samples of a received RF signal are aligned with each of one or more known potential trigger frequencies. For example, the plurality of signal samples that are representative of a received WLAN signal can be determined. The plurality of signal samples may be aligned with each of multiple potential Bluetooth trigger frequencies (e.g., four potential Bluetooth trigger frequencies) to determine if a Bluetooth trigger signal is present at one of the four potential Bluetooth trigger frequencies. The flow continues at block 210.

At block 210, the bandwidth of the plurality of signal samples aligned with each of the potential trigger frequencies is reduced to a narrowband channel centered at each of the potential trigger frequencies. For example, after the signal samples have been aligned with each of the four potential Bluetooth trigger frequencies, the plurality of signal samples of the received WLAN signal can be reduced to a narrowband channel centered at each of the four potential Bluetooth trigger frequencies. In some embodiments, digital low pass filtering can be employed to reduce the bandwidth of the plurality of signal samples aligned with each of the potential Bluetooth trigger frequencies to a narrowband channel centered at each of the potential Bluetooth trigger frequencies. The flow continues at block 220.

At block 220, the plurality of signal samples in each of the narrowband channels centered at each of the potential trigger frequencies are correlated with an expected access code associated with a narrowband wireless receiver. For example, after aligning the signal samples with each of the potential Bluetooth trigger frequencies (at block 200) and reducing the bandwidth of the signal samples to a narrowband channel (at block 210), the plurality of signal samples in each of the narrowband channels centered at each of the potential Bluetooth trigger frequencies are correlated with an expected access code associated with a Bluetooth receiver to determine if the plurality of signal samples comprises the narrowband Bluetooth trigger signal. With reference to the above example where there are four potential Bluetooth trigger frequencies, the signal samples at the narrowband channels can be correlated against an expected access code to detect the presence of a Bluetooth trigger signal in the WLAN signal. From block 220, the flow ends.

In some embodiments, aligning the signal samples with each of the potential trigger frequencies may be performed by a plurality of independent receive chains operating in parallel, such that reducing the bandwidth to a narrowband channel and correlating the signal samples in each of the narrowband channels against an expected access code may be performed utilizing all four potential trigger frequencies substantially simultaneously. Alternatively, the signal samples may be stored in a memory unit and a single receive chain may be used in combination with a time multiplexing unit to determine if the trigger signal is located at each of the potential trigger frequencies in a series implementation.

In some embodiments, the bandwidth of the wireless wideband receiver (e.g., the WLAN receiver) may be configured to simultaneously receive all the potential Bluetooth trigger frequencies. For example, if there are four potential Bluetooth trigger frequencies, the bandwidth of the WLAN receiver may be configured to receive approximately the entire 80 MHz wireless bandwidth and to simultaneously receive all the potential Bluetooth trigger frequencies located at 2402 MHz, 2425 MHz, 2450 MHz and 2480 MHz. In some implementations, in accordance with the Nyquist criteria, the 80 MHz received WLAN signal may be sampled at more than 160 MHz to detect/decode the received WLAN signal and to detect the presence of the Bluetooth trigger signal. In other implementations, if an in-phase component and a quadrature component of the 80 MHz received WLAN signal is sampled at 80 MHz and if the center frequency if 2440 Hz, it may be possible to detect the presence of the Bluetooth trigger signals within the range 2400 Hz to 2480 Hz. In some implementations, sampling the entire 80 MHz bandwidth at a sampling rate of 160 MHz may force the WLAN receiver and communication device to consume more power because the WLAN receiver may need to sample the WLAN signal at a faster rate and for a longer period of time, and the analog to digital converter of the WLAN receiver may need to support a higher bandwidth conversion rate. In some implementations, the WLAN signal can be sub-sampled to intentionally alias the potential Bluetooth trigger signals positioned at each of the four potential Bluetooth trigger frequencies into a smaller received bandwidth of the wideband channel (e.g. the WLAN channel). By utilizing sub-rate sampling to cause the potential Bluetooth trigger frequencies to fold into a smaller received bandwidth of the WLAN channel, the power consumption of the communication device can be reduced by reducing the time the WLAN receiver is operational to scan the Bluetooth trigger signals. Sub-rate sampling may allow the WLAN receiver to remain open to receive only a 20 MHz signal while still being able to extract the signal samples at all four potential Bluetooth trigger frequencies from the received 20 MHz signal. Aliasing, which results from sub-rate sampling, results in higher frequencies disguising themselves as lower frequencies. By knowing the Bluetooth signal bandwidth and the locations of the potential Bluetooth trigger frequencies in advance, sub-rate sampling can be used to fold the Bluetooth signal samples at the potential Bluetooth trigger frequencies into a smaller sampled portion of the wideband WLAN channel. In an example embodiment four 1 MHz trigger signals can be located at 2402 MHz, 2425 MHz, 2450 MHz and 2480 MHz. In this example embodiment, instead of receiving and sampling the entire 80 MHz spectrum at 160 MHz, the WLAN signal can be sub-rate sampled at a sampling rate that is less than 160 MHz to induce aliasing and folding of the signal samples at the Bluetooth trigger frequencies into the sampled portion of the WLAN signal.

By utilizing sub-rate sampling techniques, the power consumption of the communication device can be reduced by reducing the operating time and the sampling rate of the WLAN receiver. More specifically, instead of receiving and sampling the entire 80 MHz spectrum at 160 MHz to properly sample the signal at the potential Bluetooth trigger frequencies, a 40 MHz bandwidth of the WLAN signal can be sub-rate sampled. By knowing the locations of the potential Bluetooth trigger frequencies for the trigger signal samples, the signal samples at the potential Bluetooth trigger frequencies can be identified in the 40 MHz bandwidth by taking advantage of the aliasing caused by the sub-rate sampling. The signal samples can then be aligned at the identified potential Bluetooth trigger frequencies, reduced to a narrowband signal, and then correlated with the expected access code.

In some embodiments, if the WLAN medium is very busy (e.g., if more than a predetermined number of packets are received per time period), there may be inadequate periods of inactivity and/or inadequate random back-off periods available to scan for the Bluetooth trigger signals. If the WLAN medium is too busy to perform the scan within the time period to meet the Bluetooth specification, the communication device may revert back to a standard mode for detecting the Bluetooth trigger signals. For example, the Bluetooth receiver may be powered-up to scan for the Bluetooth trigger signals at predetermined scanning time intervals (e.g., determined by the Bluetooth specification).

In some implementations, the WLAN medium may comprise a wideband blocker that may prevent the WLAN receiver from being able to detect the Bluetooth trigger signals. In this implementation, the WLAN receiver may be powered down and the Bluetooth receiver may be powered up to scan for the Bluetooth trigger signals at the predetermined scanning time intervals. The wideband blockers within the WLAN signal may be identified by assessing the wideband channel. In one embodiment, to determine if wideband interference representative of a wideband blocker is present within the WLAN channel, the energy of narrowband channels (i.e. 1 MHz channels) within the wideband channel of interest can be measured. If the measured energies of the narrowband channels within the wideband channel are substantially comparable to each other (e.g., within 2% of each other, within 5% of each other, etc.), it may be determined that the wideband WLAN channel of interest comprises a wideband blocker. If a wideband blocker is identified, the WLAN receiver may not be used to scan for the Bluetooth trigger signals. Instead, to avoid performance issues, the Bluetooth receiver may be used to scan for the Bluetooth trigger signals.

Figure 4:
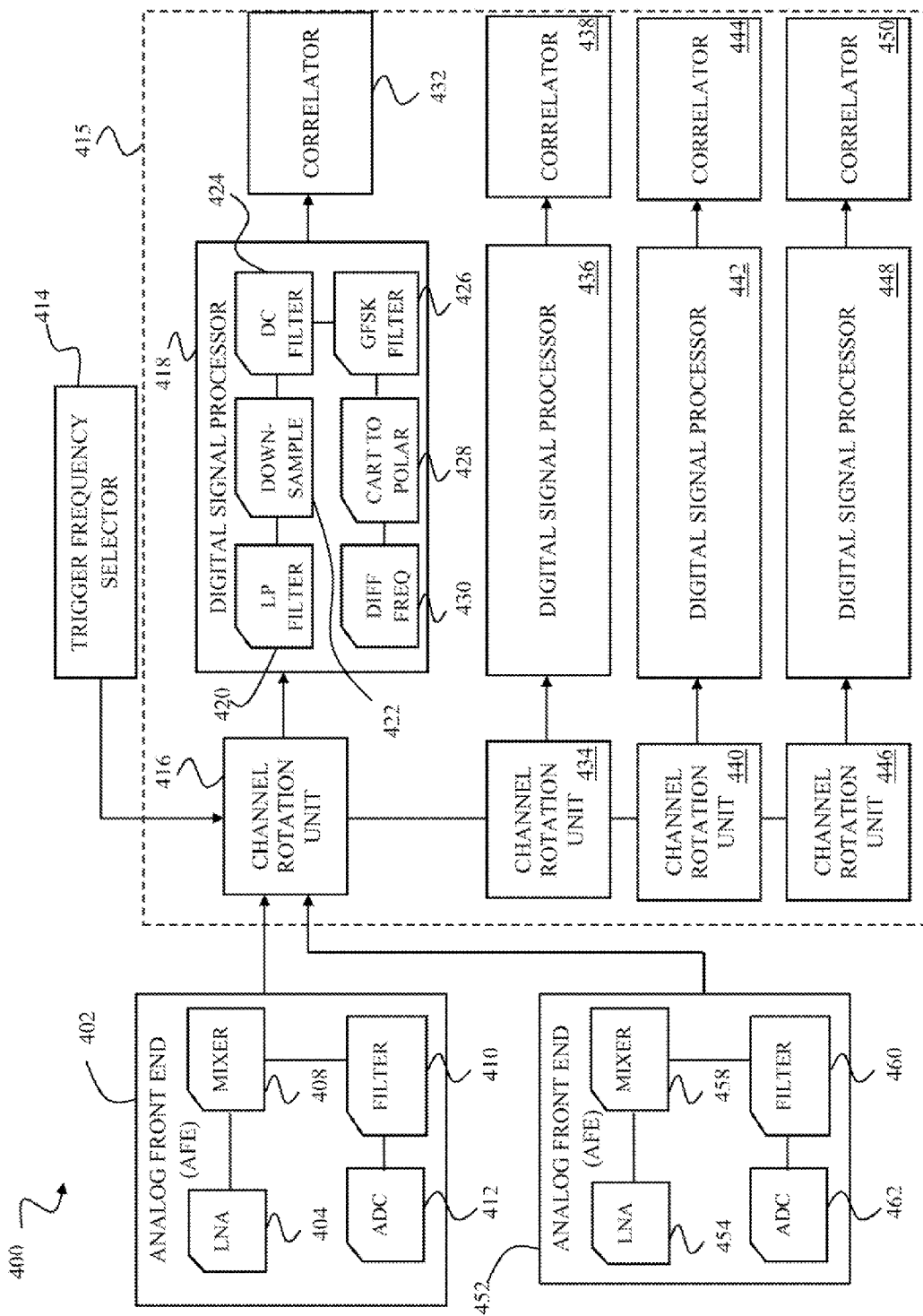
FIG. 4 is an example block diagram including a mechanism for determining if a narrowband trigger signal is present in a plurality of signal samples at a potential trigger frequency utilizing parallel receive chains.

A system for executing operations described above in FIG. 1 and FIG. 2 is illustrated with reference to FIG. 4. FIG. 4 illustrates a wideband receiver 400 of a wireless device. The wireless device may comprise the wideband receiver 400 collocated with a narrowband receiver (not shown). In one embodiment, the wideband receiver may be a WLAN receiver and the narrowband receiver may be a Bluetooth receiver. In some embodiments, the Bluetooth receiver and the WLAN receiver may be embodied in distinct integrated circuits on a common circuit board or on different circuit boards positioned in close proximity to one another. In other embodiments, the Bluetooth receiver and the WLAN receiver may be embodied in a single integrated circuit (e.g., a system on a chip (SoC)). The Bluetooth receiver and the WLAN receiver may be included within various types of electronic devices with wireless communication capabilities, including, but not limited to mobile phones, notebook computers, tablet computers, gaming consoles, laptop computers, smart appliances, desktop computers, or other suitable electronic devices. In addition to Bluetooth communication functionality and WLAN communication functionality, in some implementations, the wireless device can also comprise other communication functionality (e.g., WiMAX communication functionality, powerline communication functionality, etc.). In addition, the Bluetooth device (that comprises the Bluetooth receiver) and the WLAN device (that comprises the WLAN receiver) may share one or more processing components of the wideband receiver 400 (i.e., the WLAN receiver 400). As depicted with reference to FIG. 4, for performing wideband detection of a narrowband trigger signal (e.g., the Bluetooth trigger signal), the WLAN receiver 400 may include, an analog front end (AFE) 402 in communication with a radio frequency antenna (not shown) to receive a WLAN signal. In some implementations, the AFE 402 of the WLAN receiver 400 may be shared by the Bluetooth receiver and the WLAN receiver. The AFE 402 comprises a low noise amplifier (LNA) 404, a mixer unit 408, one or more filter stages 410, and an analog to digital converter (ADC) 412. Although not depicted in FIG. 4, the AFE 402 can also comprise one or more additional processing units (e.g., additional amplifier stages). As depicted in FIG. 4, the WLAN receiver 400 also comprises a trigger frequency selector 414. The AFE 402 (e.g., the output of the ADC 412) is coupled with a narrowband trigger signal detector 415. The narrowband trigger signal detector 415 comprises a plurality of channel rotation units 416, 434, 440, 446, a plurality of digital signal processors 418, 436, 442, 448, and a plurality of correlators 432, 438, 444, 450. The channel rotation units 416, 434, 440, 446 are also coupled with a trigger frequency selector 414. The output of the channel rotation units 416, 434, 440, 446 is also coupled with the digital signal processors 418, 436, 442, 448 respectively. The digital signal processor 418 comprises a low-pass filter 420, a down-sampler 422, a DC filter 424, a Gaussian frequency-shift keying (GFSK) filter 426, a Cartesian-to-polar converter 428, and a differential frequency mixer 430. Likewise, the digital signal processors 436, 442, 448 may also comprise similar components as the digital signal processor 418. The output of the digital signal processors 418, 436, 442, 448 is coupled with the correlators 432, 438, 444, 450 respectively. As will be further described below, the channel rotation units 416, 434, 440, 446, the digital signal processors 418, 436, 442, 448, and the correlators 432, 438, 444, 450, in combination with the trigger frequency selector 414, can be used to detect the presence of a Bluetooth trigger signal within a received WLAN signal. It is noted that although FIG. 4 depicts the WLAN receiver 400 comprising four processing paths (i.e., four channel rotation units, four digital signal processors, and four correlators), embodiments are not so limited. In other embodiments, the WLAN receiver 400 can comprise other suitable number of processing paths (e.g., three processing paths, five processing paths, etc.).

In one example embodiment, the WLAN receiver 400 can receive an incoming WLAN RF signal comprising one or more WLAN packets at the AFE 402. In some embodiments, the received WLAN signal may be an 80 MHz signal that includes all of the potential Bluetooth trigger frequencies identified by the trigger frequency selector 414. In another embodiment, the received WLAN signal may be sub-rate sampled to reduce the bandwidth of the received WLAN signal by inducing aliasing of at least one of the potential Bluetooth trigger frequencies into the reduced bandwidth. Referring to the AFE 402, the LNA 404 may amplify the received WLAN signal, the mixer 408 may down-convert the received WLAN signal, the filter stage 410 may filter the received WLAN signal, and the ADC 412 may convert the analog received WLAN signal into a plurality of signal samples representative of the received WLAN signal. In other words, the ADC 412 may sample the received WLAN signal to generate time domain samples of the received WLAN signal. The trigger frequency selector 414 can comprise an indication of the potential Bluetooth trigger frequencies at which the Bluetooth trigger signal can be transmitted. The trigger frequency selector 414 can communicate the potential Bluetooth trigger frequencies to the channel rotation units 416, 434, 440, 446 of the narrowband trigger signal detector 415. In some embodiments, the trigger frequency selector 414 may be implemented in firmware to allow for modification of the selected potential Bluetooth trigger frequencies.

Each of the channel rotation units 416, 434, 440, 446 rotates to one of the potential Bluetooth trigger frequency identified by the trigger frequency selector 414 and aligns the signal samples from the ADC 412 with the identified potential Bluetooth trigger frequency. Next, the aligned signal samples at the output of the channel rotation units 416, 434, 440, 446 are processed by the digital signal processors 418, 436, 442, 448 respectively. Next, for each of the potential trigger frequencies, the signal samples at the output of the digital signal processors 418, 436, 442, 448 are provided to the correlators 432, 438, 444, 450 respectively. The correlators 432, 438, 444, 450 can correlate the signal samples with an expected access code known by the WLAN receiver 400. If the signal samples comprise the expected access code and a positive correlation exists, the WLAN receiver 400 can determine that a Bluetooth trigger signal is present at the identified Bluetooth trigger frequency. Accordingly, the WLAN receiver 400 can notify the Bluetooth receiver of the presence of the Bluetooth trigger signal. Based on knowledge of the Bluetooth trigger frequency at which the Bluetooth trigger signal was transmitted, the Bluetooth receiver can attempt to reestablish a connection with the Bluetooth device that transmitted the Bluetooth trigger signal.

It is noted that in some implementations, to reduce the power consumption of the wireless device, the duration for which the WLAN receiver is configured to receive the WLAN signal may be reduced by utilizing sub-rate sampling at the ADC 412 of the AFE 402. To provide for sub-rate sampling, in one embodiment as depicted in FIG. 4, the WLAN receiver may comprise two AFEs 402 and 452 coupled to the channel rotation units 416, 434, 440, 446. The second AFE 452 can be a second receiver for the WLAN signal. The second AFE 452 comprises a low-noise amplifier 454, a mixer 458, a filter stage 460, and an analog to digital converter 462. Although not depicted in FIG. 4, the AFE 452 can also comprise one or more additional processing units (e.g., additional amplifier stages). The AFE 402 in combination with the AFE 452 may be used to receive the WLAN signal and to transmit the signal samples to the channel rotation units 416, 434, 440, 446. In one example embodiment, the AFE 402 may receive a first 40 MHz portion of the WLAN channel and the AFE 452 may receive a second 40 MHz portion of the WLAN channel. The ADCs 412, 462 may then sub-rate sample each of the 40 MHz WLAN signals to induce aliasing of the potential Bluetooth trigger frequencies into the 40 MHZ bandwidth of the WLAN signal. It is noted, however, that in other implementations, the WLAN receiver may only comprise one AFE or may comprise other suitable number of AFEs.

In another embodiment, the narrowband trigger signal detector 415 may include a memory unit to store the signal samples received from the ADC 412. The memory unit in combination with a time multiplexer may allow the wireless receiver to operate at a higher clock rate while processing the signal samples through the channel rotation units 416, 434, 440, 446, the digital signal processors 418, 436, 442, 448, and the correlators 432, 438, 444, 450 in a series implementation.

In one embodiment, a Bluetooth device requesting a reconnection with the wireless device comprising WLAN receiver 400, may begin transmitting a Bluetooth trigger signal on a 2402 MHz Bluetooth trigger frequency. During a period of inactivity or during a random back-off period, the WLAN receiver 400 may remain in an active operating mode and may receive an 80 MHz WLAN signal comprising four Bluetooth trigger frequencies at 2402 MHz, 2425 MHz, 2450 MHz, and 2480 MHz. The WLAN signal is received at the AFE 402 and the ADC 412 generates a plurality of signal samples representative of the WLAN signal. The four Bluetooth trigger frequencies known to the trigger frequency selector 414 may be communicated to the channel rotation units 416, 434, 440, 446 of the narrowband trigger signal detector 415. The channel rotation unit 416 may align the signal samples at 2402 MHz; the channel rotation unit 434 may align the signal samples at 2425 MHz; the channel rotation unit 440 may align the signal samples at 2450 MHz; and the channel rotation unit 446 may align the signal samples at 2480 MHz. The digital signal processor 418 and the correlator 432 may then process and correlate the signal samples at 2402 MHz to determine if the Bluetooth trigger signal is present at the 2402 MHz Bluetooth trigger frequency. The digital signal processor 436 and the correlator 438 may process and correlate the signal samples at 2425 MHz to determine if the Bluetooth trigger signal is present at the 2425 MHz Bluetooth trigger frequency. The digital signal processor 442 and the correlator 444 may process and correlate the signal samples at 2450 MHz to determine if the Bluetooth trigger signal is present at the 2450 MHz Bluetooth trigger frequency. The digital signal processor 448 and the correlator 450 may process and correlate the signal samples at 2480 MHz to determine if the Bluetooth trigger signal is present at the 2480 MHz Bluetooth trigger frequency. Each of the processing paths comprising a channel rotation unit, a corresponding digital signal processor, and a corresponding correlator may operate in parallel or in series. If one of the correlators identifies a Bluetooth trigger signal present at one of the Bluetooth trigger frequencies, the Bluetooth receiver can be notified of the presence of the Bluetooth trigger signal and the Bluetooth trigger frequency at which the Bluetooth trigger signal was detected.

Figure 3:
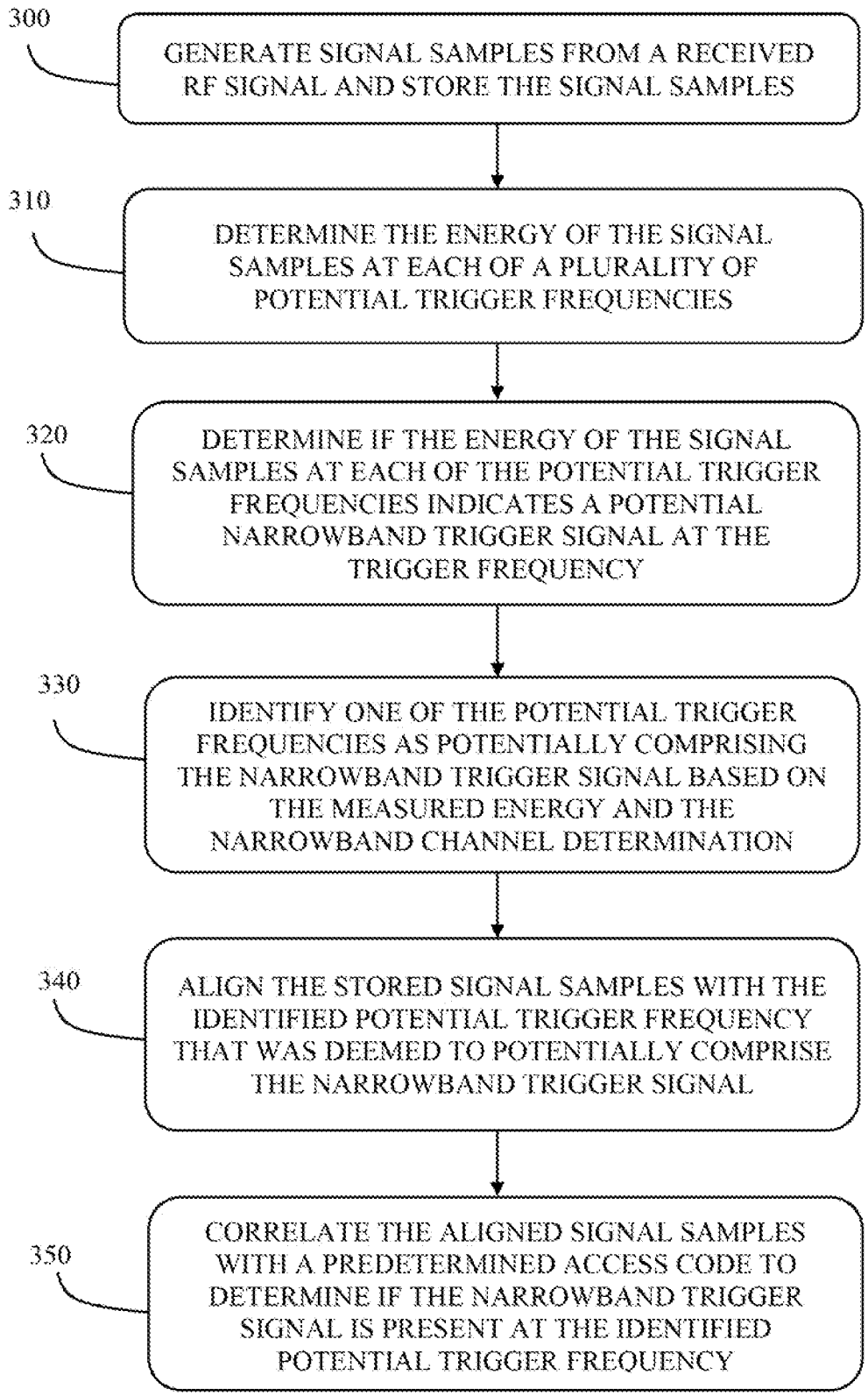
FIG. 3 is a flow diagram illustrating example operations for determining if a narrowband trigger signal is present at a potential trigger frequency utilizing energy detection.

FIG. 3 is a flow diagram illustrating example operations for determining if a narrowband trigger signal (e.g., a Bluetooth trigger signal) is present at a potential trigger frequency utilizing energy detection. The flow diagram of FIG. 3 begins at block 300. In the example embodiment described with reference to FIG. 3, a wideband receiver generates a plurality of signal samples from a received RF signal and stores the plurality of signal samples in a memory unit at block 300. The operations of blocks 310-350 are then executed to determine if the plurality of signal samples comprises a narrowband trigger signal at one of the potential trigger frequencies. Thus, at block 310, the energy of the signal samples at each of the potential trigger frequencies is measured. At block 320, it is determined if the energy level of the signal samples at each of the potential trigger frequencies is representative of a possible trigger signal at the potential trigger frequency. For example, it may be determined if the energy level of the signal samples at each of the potential trigger frequencies is greater than a predetermined energy threshold. As another example, it may then be determined if the measured energy is representative of a narrowband channel at the potential trigger frequency. Next, at block 330, based on the energy level of the signal samples at each potential trigger frequency and the narrowband channel determination at that potential trigger frequency, one of the potential trigger frequencies may be identified as possibly comprising the narrowband trigger signal. Next, at block 340, after a potential trigger frequency is identified as possibly comprising a narrowband trigger signal, the plurality of signal samples stored in the memory unit (at block 300) may be aligned with the potential trigger frequency identified at block 330. Next, at block 350, the plurality of signal samples at the potential trigger frequency (identified at block 330) may be correlated against an expected access code of the wireless device to determine if the signal samples are representative of the narrowband trigger signal. If it is determined that a narrowband trigger signal is present at the potential trigger frequency identified at block 330, the wideband receiver may notify the narrowband receiver of the presence of the narrowband trigger signal and the trigger frequency at which the trigger signal was detected.

Although FIG. 3 describes the wideband receiver detecting the narrowband trigger signal on one potential trigger frequency, embodiments are not so limited. In other embodiments, the wideband receiver can identify multiple potential trigger frequencies that could comprise the narrowband trigger signal. In this embodiment, the signal samples from the memory unit may be aligned with each of the detected potential trigger frequencies. Correlation can be performed at each of the detected potential trigger frequencies to identify which of the detected potential frequencies comprises the narrowband trigger signal.

In a specific embodiment of the above-described method for determining if a Bluetooth trigger signal is present in a received WLAN signal, a plurality of signal samples can be extracted from the received WLAN signal and the plurality of signal samples can be stored in a memory unit. The potential Bluetooth trigger frequencies may be identified to be 2402 MHz, 2425 MHz, 2450 MHz and 2480 MHz. The energy of the signal samples at each of these potential trigger frequencies may then be measured to determine if any of these potential trigger frequencies could comprise a Bluetooth trigger signal. Assuming that it is determined that the energy of the signal samples measured at 2402 MHz is representative of a possible Bluetooth trigger signal, the signal samples in the vicinity of 2402 MHz (e.g., 2402 MHz+/−1 MHz or another suitable predetermined range) may then be analyzed to determine if the signal samples are representative of a narrowband channel. If the energy level of the signal samples at 2402 MHz and the narrowband determination indicate the possibility of a Bluetooth trigger signal at 2402 MHz, the plurality of signal samples stored in the memory unit may be aligned at 2402 MHz. The signal samples may then be correlated against an expected access code of the wireless device to determine if the signal samples are representative of a Bluetooth trigger signal from another Bluetooth device requesting a connection with the wireless device. If a positive correlation exists, the WLAN receiver may notify the Bluetooth receiver of the presence of the Bluetooth trigger signal at 2402 MHz and the Bluetooth receiver may begin to reestablish the connection with the requesting Bluetooth device.

Figure 5:
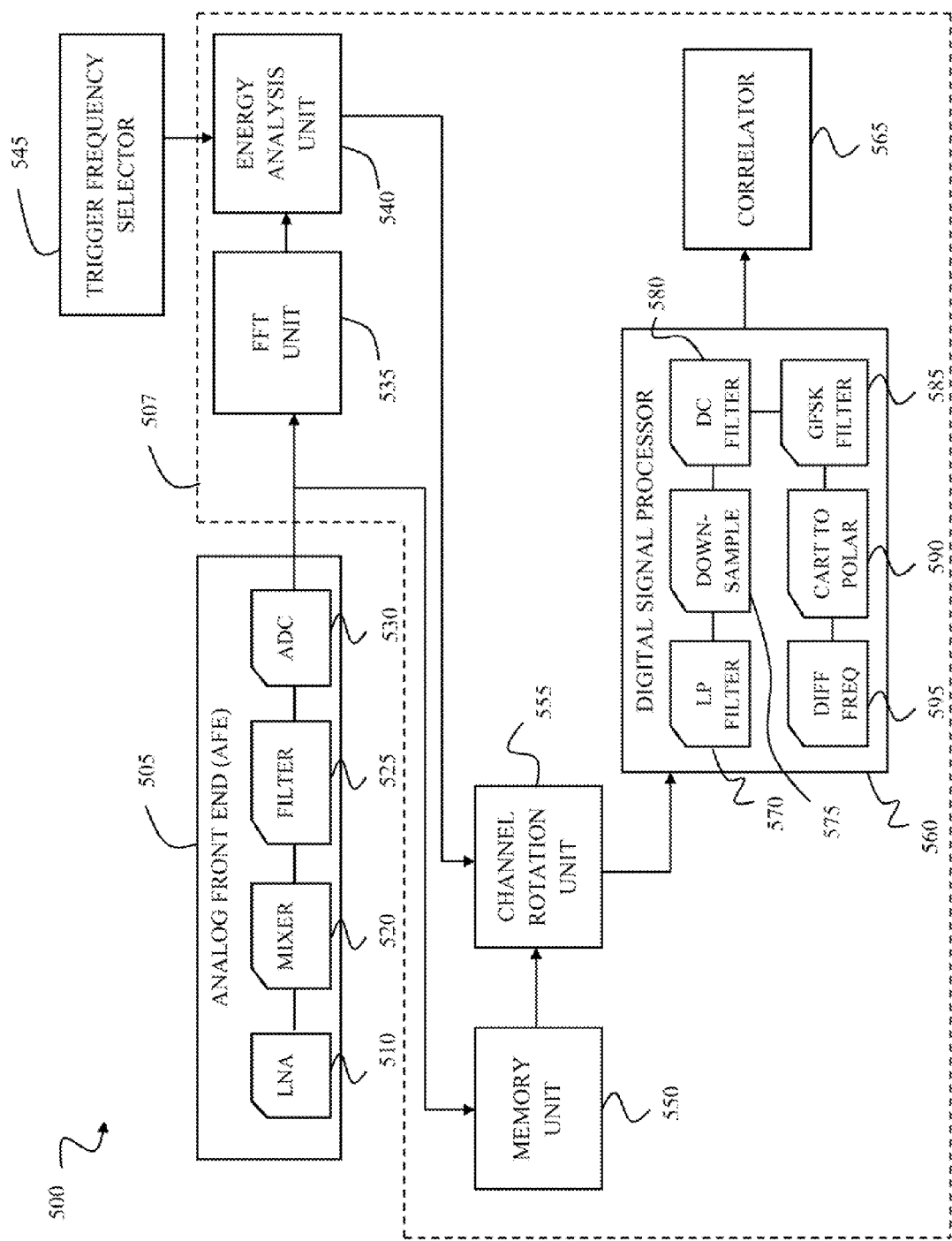
FIG. 5 is a block diagram of a system for determining if a narrowband trigger signal is present in a plurality of signal samples at a potential trigger frequency utilizing energy detection.

A system for executing operations described above in FIG. 1 and FIG. 3 is illustrated with reference to FIG. 5. FIG. 5 illustrates a wireless receiver 500 of a wireless device. The wireless device may comprise a wideband receiver (e.g., the wireless receiver 500) and a narrowband receiver. In some embodiments, the wideband receiver may be a WLAN receiver and the narrowband receiver may be a Bluetooth receiver. In some embodiments, the Bluetooth receiver and the WLAN receiver may be implemented in distinct integrated circuits on a common circuit board or on different circuit boards positioned in close proximity to one another. In other embodiments, the Bluetooth receiver and the WLAN receiver may be implemented in a single integrated circuit. The Bluetooth receiver and the WLAN receiver may be included within various types of electronic devices with wireless communication capabilities, including, but not limited to mobile phones, notebook computers, tablet computers, gaming consoles, laptop computers, smart appliances, desktop computers, or other suitable electronic devices. In addition to Bluetooth communication functionality and WLAN communication functionality, in some implementations, the electronic device can also comprise other communication functionality (e.g., WiMAX communication functionality, powerline communication functionality, etc.). In addition, the Bluetooth device (that comprises the Bluetooth receiver) and the WLAN device (that comprises the WLAN receiver) may share one or more processing components of the wireless receiver 500. The wireless receiver 500 of FIG. 5 comprises an AFE 505, which may be shared by the Bluetooth receiver and the WLAN receiver. The AFE 505 comprises an LNA 510, a mixer 520, one or more filter stages 525, and an ADC 530. Additionally, the AFE 505 can also comprise other processing units (e.g., one or more analog gain stages). The AFE 505 may be coupled with a radio frequency antenna (not shown) to receive a wideband signal. The output of the AFE 505 is coupled with a narrowband trigger signal detector 507. The narrowband trigger signal detector 507 comprises a Fast Fourier Transform (FFT) unit 535, a memory unit 550, an energy analysis unit 540, channel rotation unit 555, a digital signal processor 560, and a correlator 565. The output of the ADC 530 is coupled with the FFT unit 535 and memory unit 550. The energy analysis unit 540 receives inputs from the trigger frequency selector 545 and the FFT unit 535 and the output of the energy analysis unit 540 is coupled with the channel rotation unit 555. The channel rotation unit 555 receives inputs from the memory unit 550 and the energy analysis unit 540 and the output of the channel rotation unit 555 is coupled with the digital signal processor 560. The output of the digital signal processor 560 is coupled with the correlator 565. The digital signal processor 560 comprises a low-pass filter 570, a down-sampler 575, a DC filter 580, a Gaussian frequency-shift keying filter 585, a Cartesian to polar converter 590, and a differential frequency mixer 595. As will be described below, the energy analysis unit 540 can determine if the potential narrowband trigger frequencies within the wideband signal received at the wireless receiver 500 may comprise the narrowband trigger signal.

In an example embodiment, where the wireless device comprises a Bluetooth receiver collocated with a WLAN receiver, the WLAN receiver 500 receives an incoming RF WLAN signal at the AFE 505. Within the AFE 505, the LNA 510 may amplify the received WLAN signal, the mixer 520 may down-convert the received WLAN signal, the filter stage 525 may filter the received signal, and the ADC 530 may convert the analog received WLAN signal into a plurality of signal samples representative of the received WLAN signal. In other words, the ADC 530 may sample the received WLAN signal to generate time domain samples of the received WLAN signal. The signal samples generated by the ADC 530 may be stored in the memory unit 550. The signal samples are also provided to the FFT unit 535. The FFT unit 535 converts the WLAN signal samples from the time domain into the frequency domain to yield frequency domain samples of the received WLAN signal. The FFT unit 535 provides the frequency domain samples of the received WLAN signal to the energy analysis unit 540. The trigger frequency selector 545 can communicate the potential Bluetooth trigger frequencies (on which the Bluetooth trigger signal may be transmitted) to the energy analysis unit 540 Based on knowledge of the potential Bluetooth trigger frequencies, the energy analysis unit 540 can measure the energy level of the signal samples at each of the potential Bluetooth trigger frequencies. If the energy measurement at least one of the potential Bluetooth trigger frequencies indicates that a Bluetooth trigger signal may be present at that potential Bluetooth trigger frequency, the energy in the vicinity of the potential Bluetooth trigger frequency is measured to determine if the measured energy is representative of a narrowband channel. If the energy measurement and the narrowband channel determination indicate that the Bluetooth trigger signal may be present at the potential Bluetooth trigger frequency, the energy analysis unit 540 can notify the channel rotation unit 555 to rotate to the identified potential Bluetooth trigger frequency and to align the signal samples stored in the memory unit 550 with the identified potential Bluetooth trigger frequency. The aligned signal samples may then be provided from the channel rotation unit 555 to the digital signal processor 560. After the signal samples have been processed by the digital signal processor 560, the signal samples may be provided to the correlator 565. The correlator 565 may correlate the signal samples with an expected access code known by the wireless receiver 500. If the signal samples comprise the expected access code and a positive correlation exists, the wireless receiver 500 may determine that the Bluetooth trigger signal is present at the identified Bluetooth trigger frequency. Accordingly, the Bluetooth receiver may be notified of the presence of the Bluetooth trigger signal at the identified Bluetooth trigger frequency. Based on knowledge of the Bluetooth trigger frequency at which the Bluetooth trigger signal was transmitted, the Bluetooth receiver can attempt reestablish a connection with the Bluetooth device that transmitted the Bluetooth trigger signal.

In another embodiment, the wireless receiver 500 may include two or more duplicate WLAN chains, each of the WLAN chains having a channel rotation unit 555, a digital signal processor 560 and a correlator 565 (as depicted above with reference to FIG. 4). In some instances, the energy analysis unit 540 may identify more than one of the potential Bluetooth trigger frequencies as possibly comprising a Bluetooth trigger signal. In this instance, the wireless receiver 500 can use the additional WLAN chains to align, process, and correlate the signal samples for each of the identified potential Bluetooth trigger frequencies.

In some embodiments, a Bluetooth device requesting reconnection with the wireless device (comprising the wireless receiver 500) may begin transmitting a Bluetooth trigger signal at a 2402 MHz Bluetooth trigger frequency. During a period of inactivity or a random back-off period, the wireless receiver 500 may receive an 80 MHz WLAN signal. Alternatively, the wireless receiver 500 may receive a WLAN signal with a smaller bandwidth and sub-rate sampling may be used. The AFE 505 can process the received WLAN signal and can generate of a plurality of signal samples representative of the WLAN signal at the output of the ADC 530. The resultant signal samples may be stored in the memory unit 550 and may also be provided to the FFT unit 535. The FFT unit 535 can convert the WLAN signal samples from the time domain into the frequency domain to yield frequency domain samples of the received WLAN signal. The FFT unit 535 can provide the frequency domain samples of the received WLAN signal to the energy analysis unit 540. The energy analysis unit 540 can also receive a notification of the potential trigger frequencies of the Bluetooth trigger signal from the trigger frequency selector 545. In this example embodiment, the potential Bluetooth trigger frequencies are located at 2402 MHz, 2425 MHz, 2450 MHz and 2480 MHz. The energy analysis unit 540 can measure the energy level of the signal samples at each of the potential trigger frequencies. Assuming that the energy measurement at the 2402 MHz Bluetooth trigger frequency indicates that a Bluetooth trigger signal may be present at 2402 MHz, the energy around 2402 MHz (e.g., a range of frequencies with 2402 MHz as the center frequency) is measured to determine if the measured energy is representative of a narrowband channel. If the energy measurement at 2042 MHz and the narrowband channel determination indicate that the Bluetooth trigger signal may be present at the 2402 MHz, the energy analysis unit 540 can prompt the channel rotation unit 555 to rotate to 2402 MHz and to align the signal samples stored in the memory unit 550 with the 2402 MHz frequency. The digital signal processor 560 can process the aligned signal samples and the correlator 565 may correlate the signal samples with an expected access code known by the wireless receiver 500. If a positive correlation exists between the signal samples and the expected access code, it can be determined that the Bluetooth trigger signal is present at 2402 MHz. The Bluetooth receiver may be notified of the presence of the Bluetooth trigger signal at 2402 MHz. The Bluetooth receiver can then attempt to reestablish a connection with the Bluetooth device that transmitted the Bluetooth trigger signal at 2402 MHz.

Embodiments may take the form of an entirely hardware embodiment, a software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer usable program code embodied in the medium. The described embodiments may be provided as a computer program product, or software, that may include a machine-readable medium having stored thereon instructions, which may be used to program a computer system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). A machine-readable medium may be a machine-readable storage medium, or a machine-readable signal medium. A machine-readable storage medium may include, for example, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of tangible medium suitable for storing electronic instructions (e.g., executable by one or more processors). A machine-readable signal medium may include a propagated data signal with computer readable program code embodied therein, for example, an electrical, optical, acoustical, or other form of propagated signal (e.g., carrier waves, infrared signals, digital signals, etc.). Program code embodied on a machine-readable signal medium may be transmitted using any suitable medium, including, but not limited to, wireline, wireless, optical fiber cable, RF, or other communications medium.

Computer program code for carrying out operations of the embodiments may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (for example, through the Internet using an Internet Service Provider).

Figure 6:
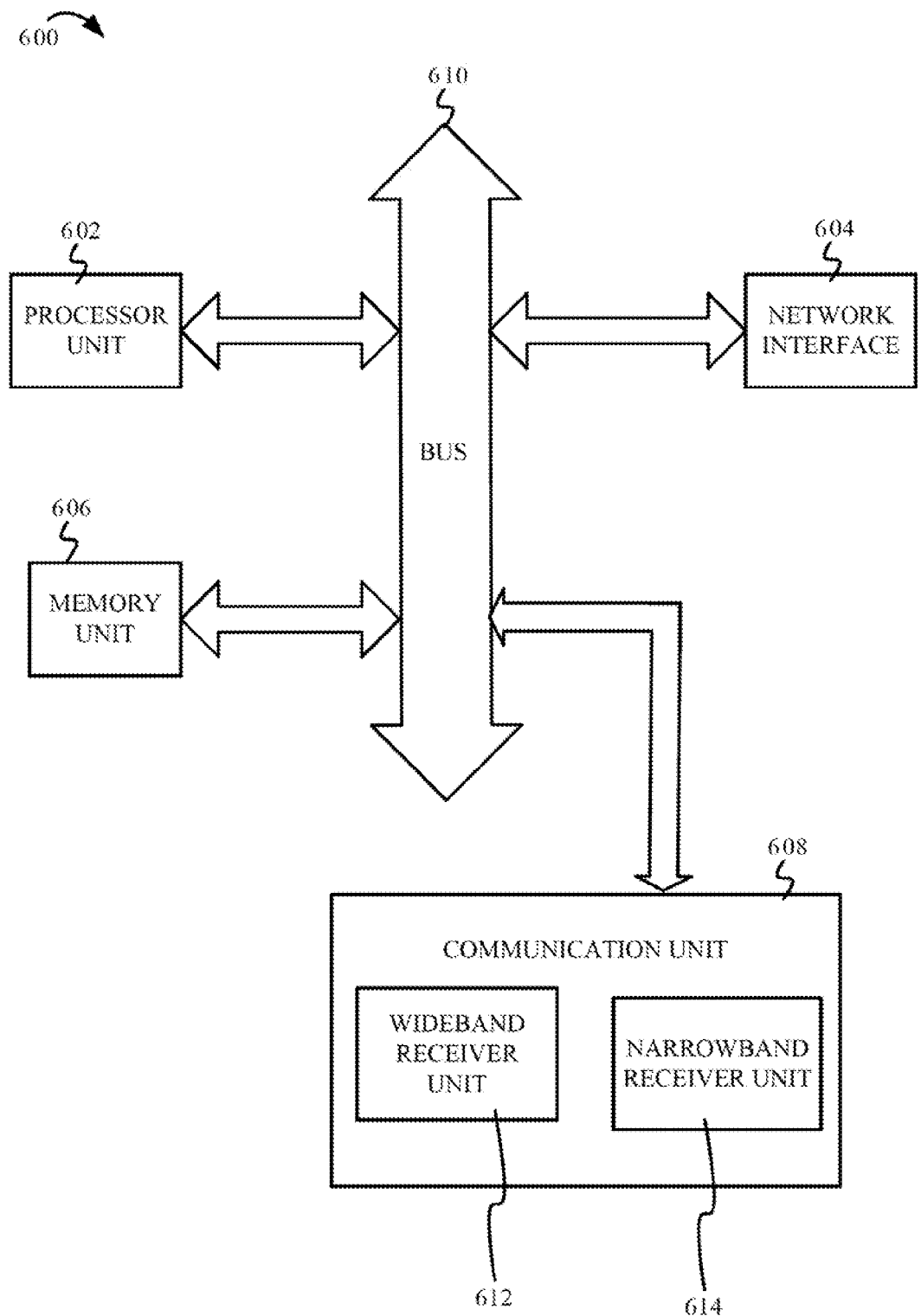
FIG. 6 is a block diagram of one embodiment of an electronic device including a wideband detection mechanism of a narrowband trigger signal.

FIG. 6 is a block diagram of one embodiment of an electronic device 600 including a wideband detection mechanism of a narrowband trigger signal. In some implementations, the electronic device 600 may be one of a notebook computer, a desktop computer, a tablet computer, a netbook, a mobile phone, a gaming console, a personal digital assistant (PDA), or other electronic systems comprising with wireless communication capabilities. The electronic device 600 can comprise a WLAN device and a collocated Bluetooth device. In other implementations, the electronic device 600 can comprise other suitable wideband communication devices and other suitable narrowband communication devices. The electronic device 600 includes a processor unit 602 (possibly including multiple processors, multiple cores, multiple nodes, and/or implementing multi-threading, etc.). The electronic device 600 includes a memory unit 606. The memory unit 606 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The electronic device 600 also includes a bus 610 (e.g., PCI, ISA, PCI-Express, HyperTransport®, Infini-Band®, NuBus, AHB, AXI, etc.), and network interfaces 604 that include at least one of a wireless network interface (e.g., a WLAN interface, a Bluetooth interface, a WiMAX interface, a ZigBee® interface, a Wireless USB interface, etc.) and a wired network interface (e.g., an Ethernet interface, etc.).

The electronic device 600 also includes a communication unit 608. The communication unit 608 comprises a wideband receiver unit 612 and a narrowband receiver unit 614. The wideband receiver unit 612 execute operations described above in FIGS. 1-5 to determine whether a narrowband trigger signal was detected at a potential trigger frequency. In response to determining that narrowband trigger signal was detected at a potential trigger frequency, the wideband receiver unit 612 can cause the narrowband receiver unit 614 to switch to an active operating mode and to establish a communication link (with the electronic device that transmitted the trigger signal) on the detected trigger frequency.

Any one of these functionalities may be partially (or entirely) implemented in hardware and/or on the processor unit 602. For example, the functionality may be implemented with an application specific integrated circuit, in logic implemented in the processor unit 602, in a co-processor on a peripheral device or card, etc. Further, realizations may include fewer or additional components not illustrated in FIG. 6 (e.g., video cards, audio cards, additional network interfaces, peripheral devices, etc.). The processor unit 602, the memory unit 606, and the network interfaces 604 are coupled to the bus 610. Although illustrated as being coupled to the bus 610, the memory unit 606 may be coupled to the processor unit 602.

While the embodiments are described with reference to various implementations and exploitations, it will be understood that these embodiments are illustrative and that the scope of the inventive subject matter is not limited to them. In general, wideband detection mechanism of a narrowband trigger signal as described herein may be implemented with facilities consistent with any hardware system or hardware systems. Many variations, modifications, additions, and improvements are possible.

Plural instances may be provided for components, operations, or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the inventive subject matter. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method for detecting a narrowband trigger in a wideband signal, the method comprising:
 receiving the wideband signal at a first receiver of a first network device, wherein the first network device comprises the first receiver and a second receiver, the first receiver is for receiving wideband signals, and the second receiver is for receiving narrowband signals;
 determining a first frequency for detection of the narrowband trigger, wherein the first frequency is positioned within a first bandwidth of the wideband signal;
 sampling the wideband signal to determine a plurality of signal samples;
 determining whether the plurality of signal samples centered at the first frequency comprise the narrowband trigger, wherein the narrowband trigger indicates a request, by a second network device, for the second receiver to receive subsequent narrowband signals at the first frequency;
 providing, to the second receiver, a notification indicating a presence of the narrowband trigger in response to determining that the plurality of signal samples centered at the first frequency comprise the narrowband trigger; and
 receiving, at the second receiver, the subsequent narrowband signals at the first frequency.

2. The method of claim 1, wherein the second receiver is a Bluetooth receiver and the narrowband trigger is a Bluetooth trigger signal.

3. The method of claim 1, wherein the first receiver is a Wireless Local Area Network (WLAN) receiver.

4. The method of claim 1, wherein said receiving the wideband signal at the first receiver comprises at least one member selected from the group consisting of, receiving the wideband signal during an idle time period associated with the first receiver, and receiving the wideband signal during a random back-off period associated with the first receiver.

5. The method of claim 1, wherein said sampling the wideband signal comprises:
 sub-rate sampling a portion of the wideband signal to induce aliasing of the plurality of signal samples at the first frequency into the sub-rate sampled portion of the wideband signal.

6. The method of claim 1, wherein said determining whether the plurality of signal samples centered at the first frequency comprise the narrowband trigger comprises:
 aligning the plurality of signal samples with the first frequency; reducing a second bandwidth of the plurality of signal samples aligned with the first frequency to a first narrowband channel centered at the first frequency; and
 correlating the plurality of signal samples in the first narrowband channel with an access code associated with the first network device to determine whether the plurality of signal samples comprises the narrowband trigger.

7. The method of claim 6, further comprising: determining whether the plurality of signal samples centered at a second frequency comprise the narrowband trigger, comprising:
 aligning the plurality of signal samples with the second frequency that is positioned within the first bandwidth of the wideband signal;
 reducing the second bandwidth of the plurality of signal samples aligned with the second frequency to a second narrowband channel centered at the second frequency; and
 correlating the plurality of signal samples in the second narrowband channel with the access code to determine whether the plurality of signal samples comprises the narrowband trigger.

8. The method of claim 6, further comprising:
 storing the plurality of signal samples in a memory associated with the first network device;
 wherein said reducing the second bandwidth comprises reducing the second bandwidth of the plurality of signal samples stored in the memory; and
 wherein said correlating the plurality of signal samples comprises correlating the plurality of signal samples by time multiplexing the plurality of signal samples stored in the memory.

9. The method of claim 1, wherein said determining whether the plurality of signal samples centered at the first frequency comprises the narrowband trigger comprises measuring an energy of the plurality of signal samples at the first frequency.

10. The method of claim 1, wherein said determining whether the plurality of signal samples centered at the first frequency comprises the narrowband trigger comprises:
 storing the plurality of signal samples in a memory of the first network device;
 measuring an energy of the plurality of signal samples centered at the first frequency;
 determining whether the energy of the plurality of signal samples is representative of a narrowband channel at the first frequency; and
 estimating that the plurality of signal samples centered at the first frequency comprises the narrowband trigger based, at least in part, on the energy of the plurality of signal samples and on a determination that the energy of the plurality of signal samples is representative of the narrowband channel.

11. The method of claim 10, further comprising:
 aligning the plurality of signal samples stored in the memory with the first frequency; and
 correlating the aligned plurality of signal samples with an access code associated with the first network device to determine whether the plurality of signal samples comprises the narrowband trigger.

12. The method of claim 1, further comprising:
 determining that a communication medium used by the first receiver to receive the wideband signal is busy;
 determining that the first receiver cannot scan the first frequency to detect the narrowband trigger in response to determining that the communication medium is busy; and
 switching the second receiver to an active operating mode to scan the first frequency and to detect the narrowband trigger in response to determining that the first receiver cannot scan the first frequency to detect the narrowband trigger.

13. The method of claim 12, wherein said switching the second receiver to the active operating mode comprises one of:
 switching the first receiver to an inactive operating mode while the second receiver determines whether the plurality of signal samples centered at the first frequency comprises the narrowband trigger, or causing the first receiver to remain in the active operating mode while the second receiver determines whether the plurality of signal samples centered at the first frequency comprises the narrowband trigger.

14. A first network device for detecting a narrowband trigger, the first network device comprising:
a processor;
a network interface coupled with the processor; and
a memory coupled with the processor,
the memory storing instructions which, when executed by the processor, cause the first network device to,
receive a wideband signal at a first receiver of the first network device, wherein the first network device comprises the first receiver and a second receiver, the first receiver is for receiving wideband signals, and the second receiver is for receiving narrowband signals,
determine a frequency for detection of the narrowband trigger, wherein the frequency is positioned within a first bandwidth of the wideband signal,
sample the wideband signal to determine a plurality of signal samples;
determine whether the plurality of signal samples centered at the frequency comprise the narrowband trigger, wherein the narrowband trigger indicates a request, by a second network device, for the second receiver to receive subsequent narrowband signals at the frequency,
provide, to the second receiver, a notification indicating a presence of the narrowband trigger in response to determining that the plurality of signal samples centered at the frequency comprises the narrowband trigger; and
receive, at the second receiver, the subsequent narrowband signals at the frequency.

15. The first network device of claim 14, wherein the narrowband trigger is a Bluetooth trigger signal, wherein the wideband signal is a Wireless Local Area Network (WLAN) signal.

16. The first network device of claim 14, wherein the instructions to sample the wideband signal comprise instructions to, sub-rate sample a portion of the wideband signal to induce aliasing of the plurality of signal samples at the frequency into the sub-rate sampled portion of the wideband signal.

17. The first network device of claim 14, wherein the instructions to determine whether the plurality of signal samples centered at the frequency comprises the narrowband trigger comprise instructions to,
align the plurality of signal samples with the frequency;
reduce a second bandwidth of the plurality of signal samples aligned with the frequency to a first narrowband channel centered at the frequency; and
correlate the plurality of signal samples in the first narrowband channel with an access code associated with the first network device to determine whether the plurality of signal samples comprises the narrowband trigger.

18. The first network device of claim 14, wherein the instructions to determine whether the plurality of signal samples centered at the frequency comprises the narrowband trigger comprise instructions to measure an energy of the plurality of signal samples at the frequency.

19. A non-transitory computer-readable medium storing computer program code, the computer program code comprising instructions executable by a processor of a first network device to cause the first network device to:
receive a wideband signal at a first receiver of the first network device, wherein the first network device comprises the first receiver and a second receiver, the first receiver is for receiving wideband signals, and the second receiver is for receiving narrowband signals;
determine a frequency for detection of a narrowband trigger, wherein the frequency is positioned within a first bandwidth of the wideband signal;
sample the wideband signal to determine a plurality of signal samples;
determine whether the plurality of signal samples centered at the frequency comprise the narrowband trigger, the narrowband trigger indicates a request, by a second network device, for the second receiver to receive subsequent narrowband signals at the frequency;
provide, to the second receiver, a notification indicating a presence of the narrowband trigger in response to determining that the plurality of signal samples centered at the frequency comprises the narrowband trigger; and
receive, at the second receiver, the subsequent narrowband signals at the frequency.

20. The non-transitory computer-readable medium of claim 19, wherein the instructions to determine whether the plurality of signal samples centered at the frequency comprises the narrowband trigger comprise instructions to:
align the plurality of signal samples with the frequency;
reduce a second bandwidth of the plurality of signal samples aligned with the frequency to a narrowband channel centered at the frequency; and
correlate the plurality of signal samples in the narrowband channel with an access code associated with the first network device to determine whether the plurality of signal samples comprises the narrowband trigger.

21. The non-transitory computer-readable medium of claim 19, wherein the instructions to determine whether the plurality of signal samples centered at the frequency comprises the narrowband trigger comprise instructions to:
store the plurality of signal samples in a memory associated with the first network device;
measure an energy of the plurality of signal samples centered at the frequency;
determine whether the energy of the plurality of signal samples is representative of a narrowband channel at the frequency;
estimate that the plurality of signal samples centered at the frequency comprises the narrowband trigger based, at least in part, on the energy of the plurality of signal samples and on a determination that the energy of the plurality of signal samples at the frequency is representative of the narrowband channel;
align the plurality of signal samples stored in the memory with the frequency; and
correlate the aligned plurality of signal samples with an access code associated with the first network device to determine whether the plurality of signal samples comprises the narrowband trigger.

* * * * *